(12) United States Patent
Dobbins et al.

(10) Patent No.: US 12,704,693 B2
(45) Date of Patent: Aug. 11, 2026

(54) SPLICE CLOSURE APPARATUS AND FIBER OPTIC DISTRIBUTION NETWORK

(71) Applicant: AFL Telecommunications LLC, Duncan, SC (US)

(72) Inventors: Patrick E. Dobbins, Greer, SC (US); Richard Megill, Taylors, SC (US)

(73) Assignee: AFL Telecommunications LLC, Duncan, SC (US)

( * ) Notice: Subject to any disclaimer, the term of this patent is extended or adjusted under 35 U.S.C. 154(b) by 553 days.

(21) Appl. No.: 18/015,760

(22) PCT Filed: Jul. 8, 2021

(86) PCT No.: PCT/US2021/040815
§ 371 (c)(1),
(2) Date: Jan. 12, 2023

(87) PCT Pub. No.: WO2022/015563
PCT Pub. Date: Jan. 20, 2022

(65) Prior Publication Data

US 2023/0221516 A1 Jul. 13, 2023

Related U.S. Application Data

(60) Provisional application No. 63/051,105, filed on Jul. 13, 2020.

(51) Int. Cl.

| | |
|---|---|
| ***G02B 6/00*** | (2006.01) |
| ***G02B 6/44*** | (2006.01) |
| *G02B 6/46* | (2006.01) |

(52) U.S. Cl.
CPC ......... *G02B 6/4471* (2013.01); *G02B 6/4442* (2013.01); *G02B 6/44465* (2023.05);
(Continued)

(58) Field of Classification Search
CPC .. G02B 6/4471; G02B 6/4442; G02B 6/4446; G02B 6/4454; G02B 6/44465;
(Continued)

(56) References Cited

U.S. PATENT DOCUMENTS 8,346,045 B2 * 1/2013 Zimmel ............. G02B 6/44526 385/88
10,222,571 B2 * 3/2019 Solheid ............. G02B 6/44765
(Continued)

FOREIGN PATENT DOCUMENTS

DE 202010018543 U1 * 7/2017 ............. H04B 10/40

OTHER PUBLICATIONS

International Search Report Corresponding with Application No. PCT/US2021/040815 on Sep. 23, 2021 (2 pages).
(Continued)

*Primary Examiner* — Jennifer Doan
(74) *Attorney, Agent, or Firm* — Dority & Manning, P.A.

(57) ABSTRACT

A splice closure apparatus and a fiber optic distribution network are provided. The splice closure apparatus includes a housing forming a plenum and an opening. A mount plate is affixed in the plenum within the housing, A signal splitter device is affixed to the mount plate. A fiber optic cable stub is extended through the opening of the housing. The cable stub includes an input optical fiber operably connected to the signal splitter device. The cable stub includes an output optical fiber operably connected to the signal splitter device.

20 Claims, 6 Drawing Sheets

(52) U.S. Cl.
CPC ..... *G02B 6/44524* (2023.05); *G02B 6/44528* (2023.05); *G02B 6/4454* (2013.01); *G02B 6/475* (2023.05)

(58) Field of Classification Search
CPC ....................... G02B 6/44524; G02B 6/44528; G02B 6/475; G02B 6/00
See application file for complete search history.

(56) References Cited

U.S. PATENT DOCUMENTS

2011/0013875 A1* 1/2011 Bran .................. G02B 6/44526 385/135
2018/0081136 A1 3/2018 Hill et al.
2020/0049921 A1 2/2020 Coenegracht et al.
2021/0251605 A1* 8/2021 Desjardins ........... A61B 8/4483

OTHER PUBLICATIONS

Mexican Office Action Corresponding to Application No. MX/a/2023/000615 on Aug. 18, 2025.

* cited by examiner

SPLICE CLOSURE APPARATUS AND FIBER OPTIC DISTRIBUTION NETWORK

CROSS-REFERENCE TO RELATED APPLICATIONS

The present application is a National Stage Patent Application of PCT/US2021/040815, filed on Jul. 8, 2021, which claims the benefit of priority to provisional application No. 63/051,105 filed on Jul. 13, 2020, the disclosure of which is incorporated by reference herein in its entirety.

FIELD

The present disclosure relates generally to splice closures for fiber optic networks.

BACKGROUND

Today, the Multiple System Operators (MSOs) (CATV Service providers) and Telephone Operating Companies (TELCOS) are increasing the available bandwidth to their consumers by reducing the number of subscribers that are sharing the bandwidth and pathway. For example, in the MSO world reducing the number of subscribers from 512 to 256 subscribers at a service node doubles the bandwidth and allows for faster internet access for each of the remaining customers. Additionally, the TELCOs reduce the fiber infrastructure requirements by using splitters and Coarse Wavelength Division Multiplexing (CWDM). To increase this rate or available bandwidth, the MSO or TELCO will add additional pathways by using different fundamental wavelengths over the existing fiber. This is done with the use of either optical filters to selectively access specific wavelengths, coarse wavelength division multiplexers (CWDM) devices, Dense Wavelength Division Multiplexing (DWDM), or any other wavelength division multiplexing (WDM) devices. Today, when this is done in an Outside Plant (OSP) location, these devices are incorporated into an optical splicing closure and mounted to a fiber optic splicing tray. The method adds significant additional cost and causes congestion in the closure that is already used to splice the reel ends and branch splice points of fiber optic cable. This combination of components, the closure, splice tray, and PLC device is assembled in the field by the MSO or TELCO personnel. With multiple cables and branch splices these splice closures are very congested, even prior to introducing an optical filter or WDM device that will take up space in a dedicated splice tray to connect the input fiber and the output fibers. This method either causes too much congestion or requires an auxiliary closure to be stubbed with a short section of fiber optic cable and sufficient fiber to address the incoming and outgoing fiber for the optical filter or WDM device.

Accordingly, improved splice closures for fiber optic networks are desired in the art. In particular, improved splice closures for fiber optic networks which provide reduced defects, fewer errors, reduced cost, improved quality, and improved impact resistance would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a splice closure apparatus is provided. The splice closure apparatus includes a housing forming a plenum and an opening. A mount plate is affixed in the plenum within the housing. A signal splitter device is affixed to the mount plate. A fiber optic cable stub is extended through the opening of the housing. The cable stub includes an input optical fiber and an output optical fiber each operably connected to the signal splitter device.

In accordance with another embodiment, a fiber optic network is provided. The fiber optic network includes a feeder fiber optic cable, an end user fiber optic cable, and a splice closure apparatus. The apparatus includes a housing forming a plenum and an opening. A mount plate is affixed in the plenum within the housing. A signal splitter device is affixed to the mount plate. A fiber optic cable stub is extended through the opening of the housing. The fiber optic cable stub includes an input optical fiber operably connected to the signal splitter device and the feeder fiber optic cable. The fiber optic cable stub includes an output optical fiber operably connected to the signal splitter device and the end user fiber optic cable.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
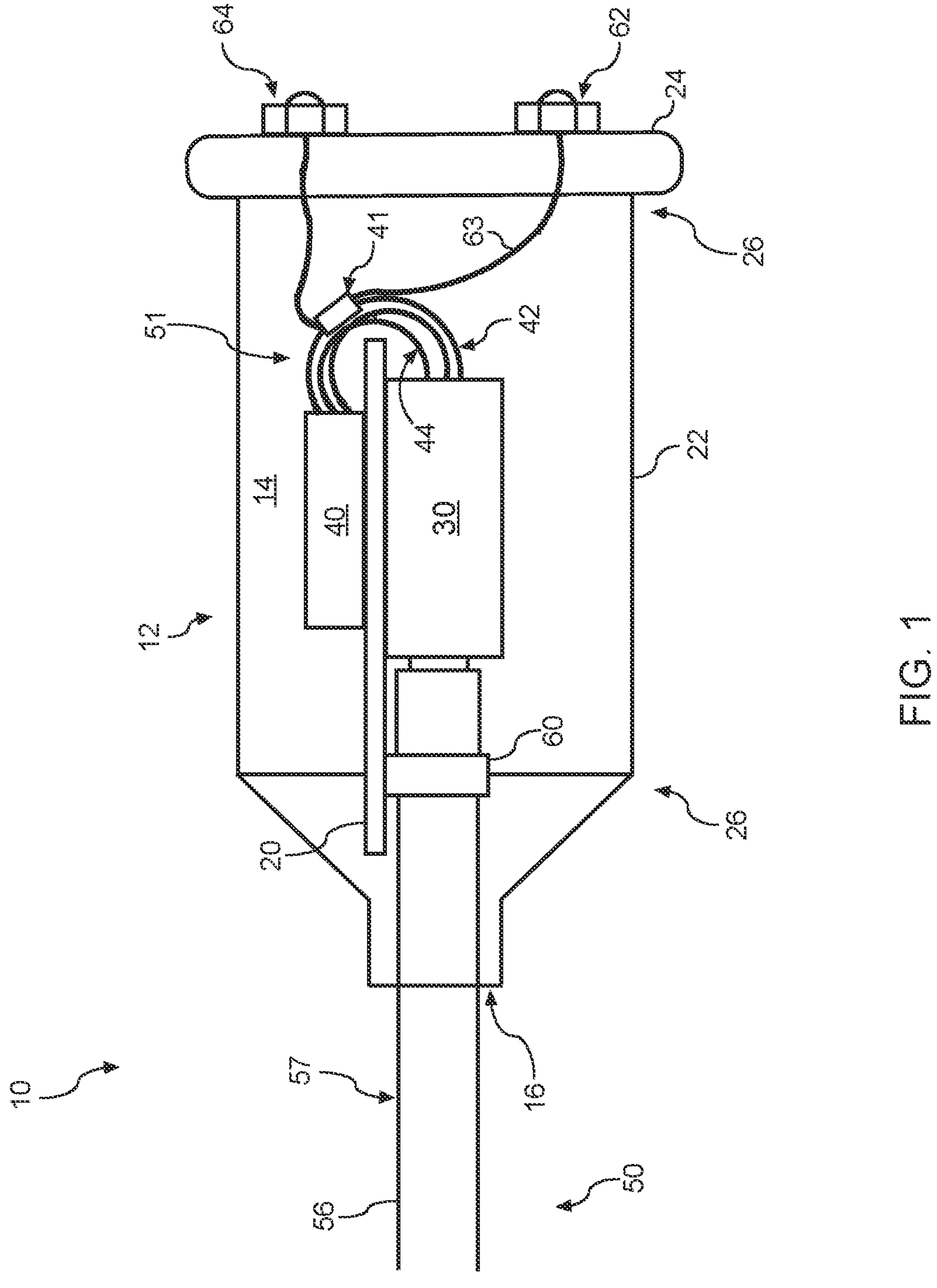
FIG. 1 is a cross-sectional side view of an exemplary embodiment of a splice closure apparatus in accordance with embodiments of the present disclosure.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is fake (or not present), A is false (or not present) and B is true (or present), and both A and B are true (or present).

Terms of approximation, such as "about," "generally," "approximately," or "substantially," include values within a ten percent full scale error from a lowest value embodiment to a highest value embodiment. For instance, an embodiment including a range from approximately 10 to approximately 100 with a ten percent full scale error may include values from 1 to 109.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Embodiments of a fiber optic distribution network and node apparatus are provided. The apparatus includes a signal splitter device, such as a planar lightwave circuit (PLC), a wavelength division multiplexer (WDM), or other coherent signal device, integrated into a plenum formed by a housing. A fiber optic cable stub including at least one input optical fiber and a plurality of output optical fibers is extended into the housing and sealed. In particular embodiments, the plenum formed by the housing is hermetically sealed and the cable stub is extended through an opening at the housing. The cable stub may particularly define an outside plant (OSP) cable configured for outside environmental conditions.

The cable stub is attached to a mount plate for pull-out retention. The mount plate is affixed within the plenum formed by the housing. Certain embodiments include a splice tray connected to the mount plate. The splice tray is utilized to connect the signal splitter device with the input and/or output fibers of the fiber optic cable stub, such as by routing the fibers and housing the fibers. The signal splitter device can be mounted in the splice tray or may be mounted to another side, such as an opposing side, of the mount plate.

The mount plate, the splice tray, and signal splitter device, and the fiber optic cable stub are secured within the housing and sealed, such as via potting with an epoxy material. Embodiments of the apparatus may be manufactured or assembled within a controlled environment, such as a temperature-controlled facility, allowing for reduced defects, errors, cost, and improved quality versus known solutions that may be assembled or spliced at an outside location. The controlled environment, such as a factory facility, may further allow for smaller, more compact, or more space-efficient components and housings. The housing, or furthermore, the housing and hermetic sealing, may further provide for impact resistance, tolerance to outside plant (OSP) conditions, and configurability to more or less stringent environmental conditions. In a particular embodiment, the apparatus is sealed to approximately 9 pounds per square inch (psi) and configured to tolerate a temperature range of approximately −40 degrees Celsius to approximately +70 degrees Celsius. In various embodiments, the apparatus is sealed to within a range of approximately ambient pressure (approximately 14.7 psi) to approximately 9 psi and configured to tolerate a temperature range of approximately −40 degrees Celsius to approximately +70 degrees Celsius.

Figure 2:
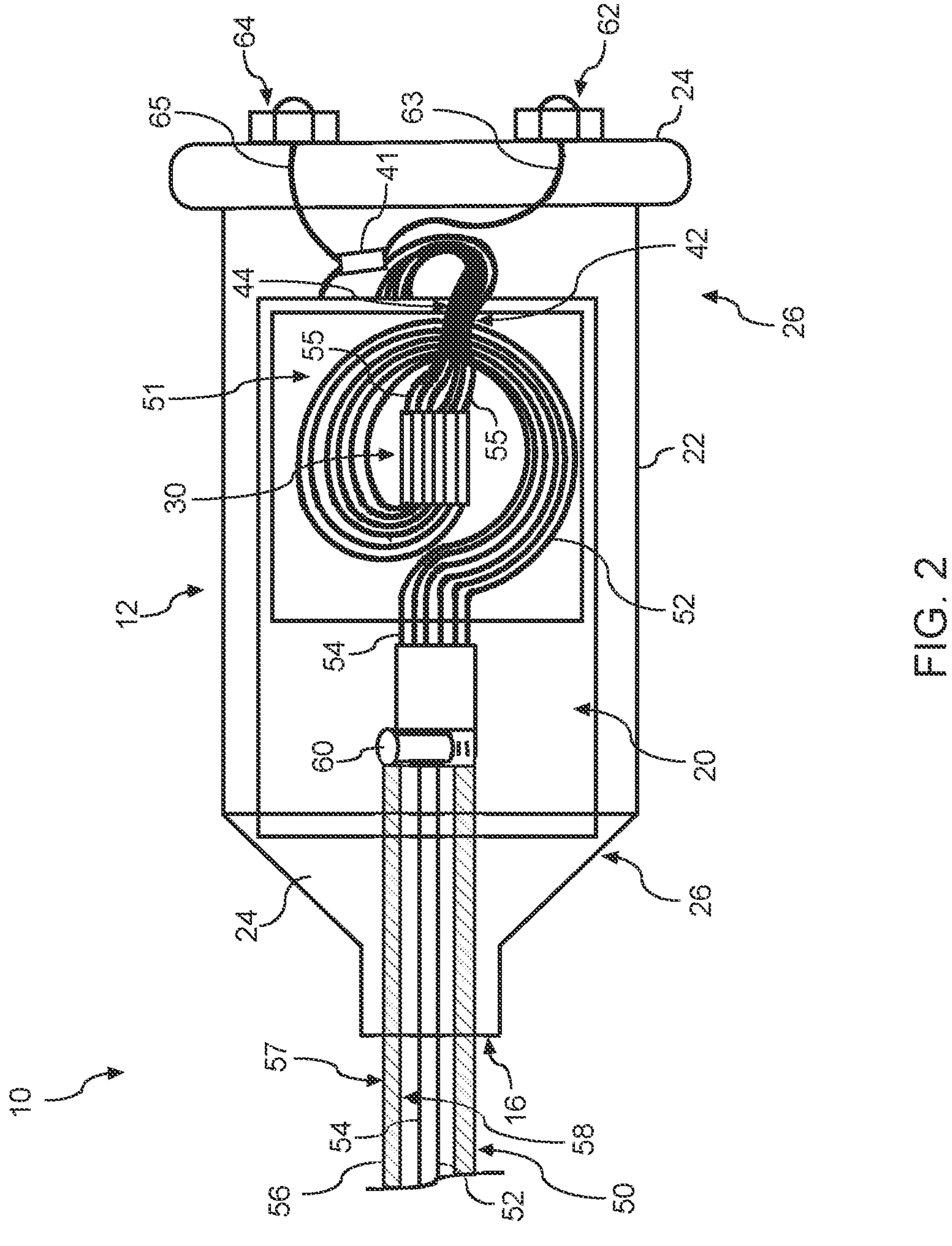
FIG. 2 is a cross-sectional bottom-up view of an exemplary embodiment of a splice closure apparatus in accordance with embodiments of the present disclosure.
Figure 3:
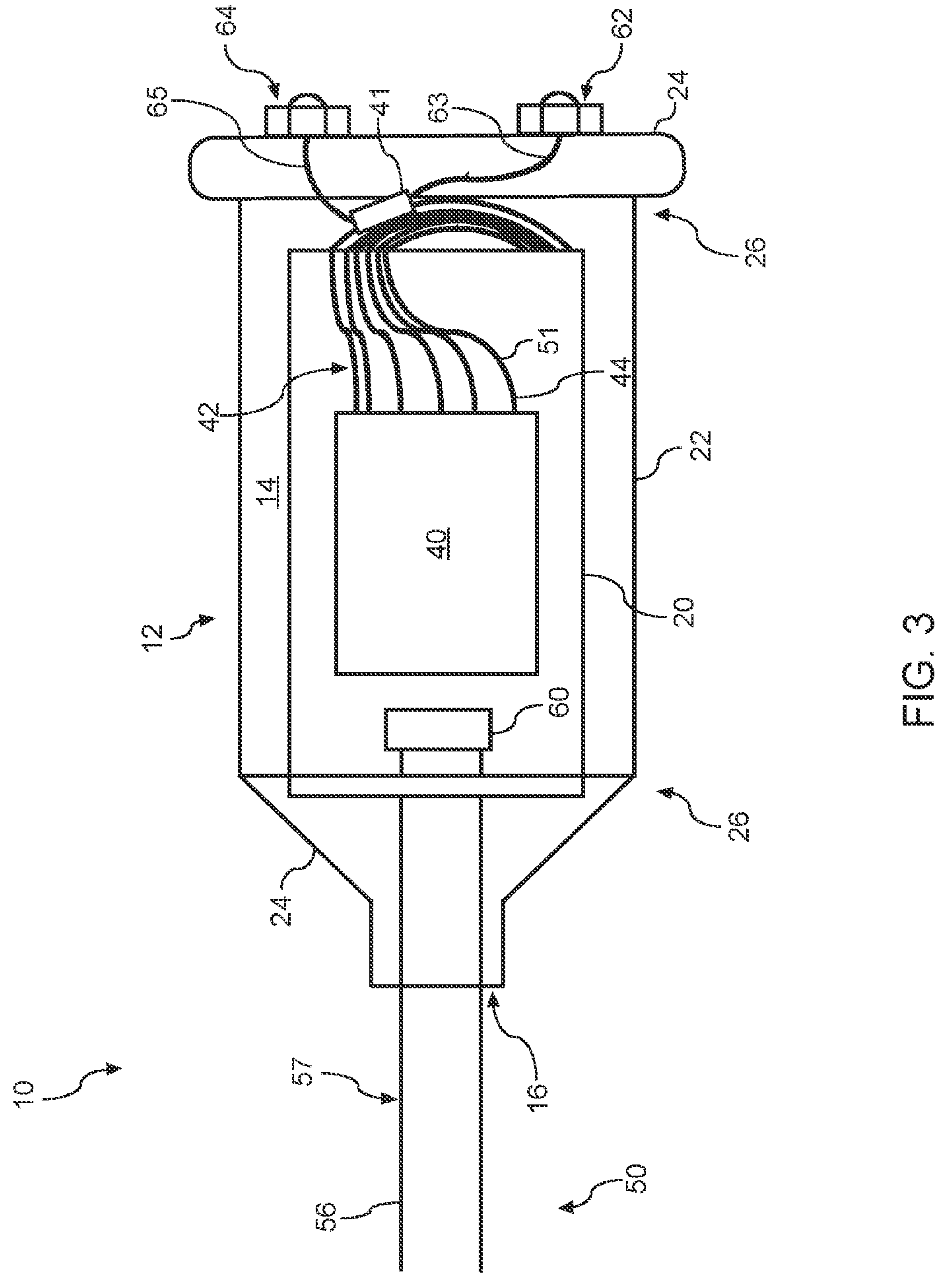
FIG. 3 is a cross-sectional top-up view of an exemplary embodiment of a splice closure apparatus in accordance with embodiments of the present disclosure.
Figure 4:
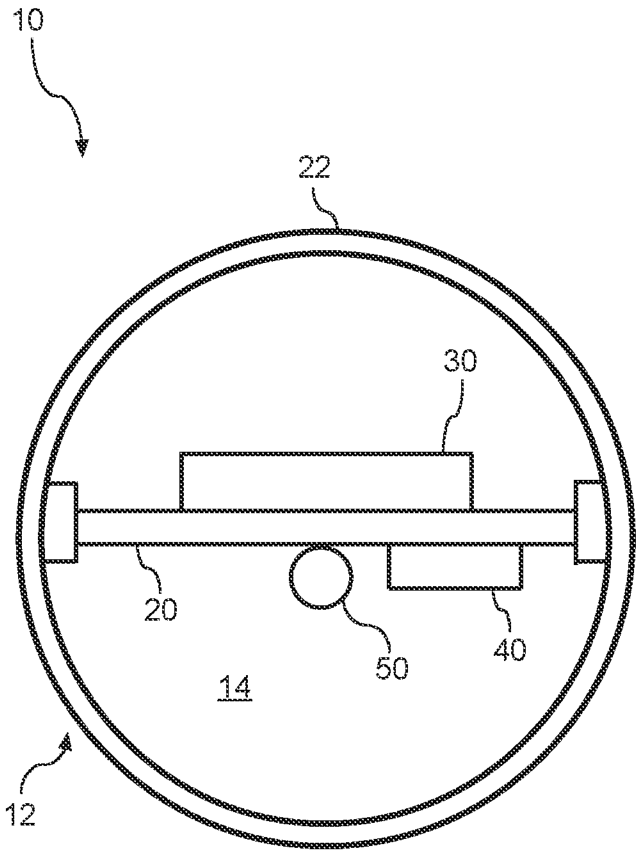
FIG. 4 is a cross-sectional end view of an exemplary embodiment of a splice closure apparatus in accordance with embodiments of the present disclosure.

Referring now to the drawings, FIG. 1 illustrates an exemplary schematic embodiment of a splice closure apparatus 10 (hereinafter, "apparatus 10"). FIG. 1 may depict a cross-sectional side view of an embodiment of the apparatus 10. FIG. 2 illustrates an exemplary bottom-up cross-sectional view of an embodiment of the apparatus 10. FIG. 3 illustrates an exemplary top-down cross-sectional view of an embodiment of the apparatus 10. FIG. 4 illustrates a cross-sectional end view of an embodiment of the apparatus 10. It should be appreciated that "bottom", "top", and "side" are provided as reference perspectives to distinguish the cross-sectional views from one another, and are not intended to limit the orientation, placement, or positioning of the components of the apparatus 10, or the apparatus 10 relative to a fiber optic distribution network. Accordingly, views denoted as "bottom-up" may be re-oriented as a top-down view or side view; views denoted as "top-down" may be re-oriented as a bottom-up view or side view; and views denoted as "side view" may be re-oriented as a top-down view or bottom-up view.

Referring to FIGS. 1-4, the apparatus 10 includes a housing 12 forming a plenum 14 and an opening 16. A mount plate 20 is affixed in the plenum 14 within the housing 12. In certain embodiments, a splice tray 30 is affixed to the mount plate 20. A signal splitter device 40 is affixed to the mount plate 20. A fiber optic cable stub 50 is extended through the opening 16 of the housing 12. In various embodiments, a clamp 60 or other appropriate clamping or fastening device affixes the cable stub 50 to the housing 12 inside the plenum 14. In a particular embodiment, the clamp 60 affixes the cable stub 50 to the mount plate 20.

The cable stub 50 includes an input optical fiber 52 and an output optical fiber 54, such as depicted in FIG. 2. The input optical fiber 52 is operably connected to the signal splitter device 40 to provide an input signal from a feeder fiber optic cable of a fiber optic distribution network, such as further depicted and described with regard to FIG. 6. A plurality of fibers 51 is operably coupled to the signal splitter device 40. In various embodiments, the plurality of fibers 51 includes an input fiber 42 and one or more output fibers 44 operably coupling the signal splitter device 40 to the cable stub 50. In one embodiment, the input fiber 42 may be the input optical fiber 52 included with the cable stub 50. In another embodiment, the input fiber 42 may be an input splice fiber 53 (FIG. 2) operably connecting the input optical fiber 52 to the signal splitter device 40. In yet another embodiment, the output fiber 44 may be the output optical fiber 54 included with the cable stub 50. In still other embodiments, the output fiber 44 may be an output splice fiber 55 (FIG. 2) operably connecting the output optical fiber 54 to the signal splitter device 40. The input signal is provided from the input optical fiber 52 to the signal splitter device 40. The output optical fiber 54 is operably connected to the signal splitter device 40 to provide an output signal to an end-user fiber optic cable of a fiber optic distribution network, such as further depicted and described with regard to FIG. 6. The output signal is provided from the signal splitter device 40 to the output optical fiber 54.

In certain embodiments, the apparatus 10 may include a splice tray 30 affixed to the mount plate 20. Embodiments of the apparatus 10 including the input splice fiber 53 and/or the output splice fiber 55 may be operably connected to the respective input optical fiber 52 and output optical fiber 54 of the cable stub 50 via the splice tray 30. The splice tray 30 may include any appropriate structure configured to hold, retain, position, or otherwise secure spliced fibers. The splice tray 30 may be configured to hold individually-spliced fibers or mass-fusion spliced fibers. In a particular embodiment, the splice tray 30 is configured to retain input optical fibers 52 from the cable stub 50 spliced with input splice fibers 53. In a still particular embodiment, the splice tray 30 is configured to retain output optical fibers 54 from the cable stub 50 spliced with output splice fiber 55. In one embodiment, the splice tray 30 is positioned on the mount plate 20 on a first side opposite of the signal splitter device 40 positioned on a second side, such as depicted in FIG. 4. Embodiments of the arrangement of the splice tray 30 and the signal splitter device 40 onto the mount plate 20 such as depicted and described in FIG. 4 may allow for more compact arrangements, smaller enclosures, reduced weight, or improved handling of the apparatus 10. However, other embodiments of the apparatus 10 may position the signal splitter device 40 and the splice tray 30 on the same side of the mount plate 20.

In various embodiments, the signal splitter device 40 is a planar lightwave circuit (PLC), a wavelength division multiplexing (WDM) device, or other appropriate device or filter that may carry a plurality of signals over an optical fiber. Exemplary WDM devices include, but are not limited to, coarse WDM devices, dense WDM devices, or any other device including a multiplexer at a transmitter to join a plurality of signals together and a demultiplexer at a receiver to split the joined signals apart.

In certain embodiments, such as depicted in FIG. 2, the fiber optic cable stub 50 includes the input optical fiber 52 and the output optical fiber 54 together in a single fiber optic cable stub 50. In one embodiment, the fiber optic cable stub 50 includes a jacket 56 having an outer surface 57 and an inner surface 58. The jacket 56 may include a single jacket layer or multiple jacket layers. The outer surface 57 is an exterior surface of the cable stub 50 and the inner surface 58 defines an interior space of the cable stub 50. The input optical fiber 52 and the output optical fiber 54 are each disposed within the interior space. A length of the cable stub 50 can be varied in accordance with a desired distance of the apparatus 10 from a node at a network, such as further depicted and described below. In various embodiments, the cable stub 50 may include a loose tube fiber optic cable, an All-Dielectric Self-Supporting® (ADSS®) fiber optic cable, a microcable, or a wrapping tube cable with a rollable ribbon, or other appropriate type of fiber optic cable.

In certain embodiments, the jacket 56 of the cable stub 50 is extended through the opening 16 of the housing 12. In various embodiments, the housing 12 includes a body 22. The mount plate 20 may be secured, supported, attached, or otherwise affixed within the plenum 14 to the body 22 of the housing 12. A cap 24 may affix to an end 26 of the body 22. In certain embodiments, a plurality of caps 24 are positioned at opposing ends 26 of the body 22, such as a cylindrical body, canister, tube, frusto-conical body, or pressure vessel. One or more caps 24 may form the opening 16 through which the cable stub 50 is extended from outside of the housing 12 into the plenum 14. In a particular embodiment, the plenum 14 is formed between the body 22 and the cap(s) 24. A potting material, such as an epoxy, may be utilized with the cap(s) 24 to seal the ends 26 of the housing 12. In still various embodiments, a shrink-wrap material may be included to seal the opening 16 and the plenum 14 from conditions outside of the housing 12. In a still particular embodiment, the housing 12 may be hermetically sealed, such as to provide an air-tight and/or liquid-tight seal between the plenum 14 and outside of the housing 12. In certain embodiments, the jacket 56 of the cable stubs 50 is any appropriate material allowing for the outer surface 57 of the cable stub 50 to be sealed at the opening 16 of the housing 12. Particular embodiments of the cable stub 50 may form the outer surface 57 of a low smoke halogen material, a polyvinyl chloride material, or other appropriate material for OSP fiber optic cable applications.

Figure 5:
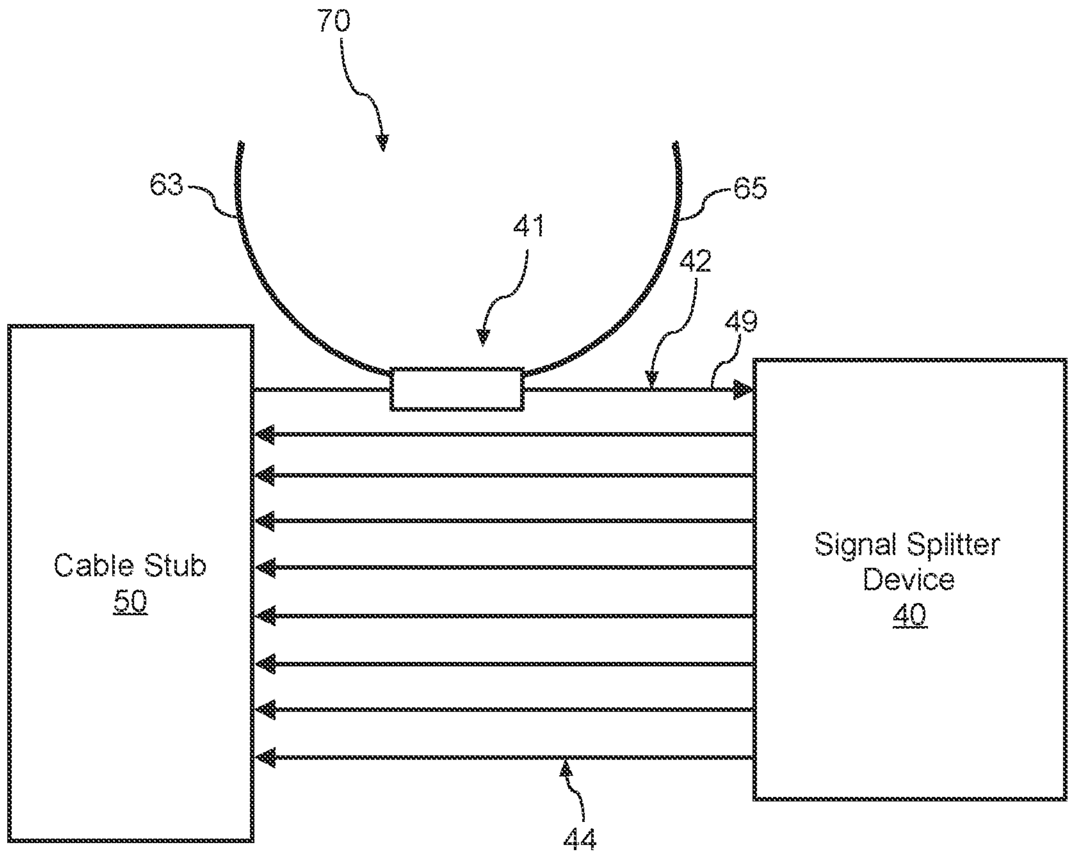
FIG. 5 depicts a detailed view of an embodiment of a portion of a splice tray and test fiber of a splice closure apparatus in accordance with embodiments of the present disclosure.

Referring now to FIG. 2, FIG. 3, and FIG. 5, an exemplary embodiment of a test interface 70 of the apparatus 10 is depicted. The test interface 70 may form a bypass access test interface allowing for testing of a receive signal and/or transmit signal from the signal splitter device 40. The test interface 70 includes a coupler 41 operably coupled to at least one input fiber 42 extended between the signal splitter device 40 and the cable stub 50. coupler 41 The coupler 41 operably connected to the input fiber 42 allows for test and receive fibers to be split for fiber optic testing. In a particular embodiment, the coupler 41 is a 2×2 coupler configured to allow for a test fiber and a receive fiber to be split from the input fiber 42. In one embodiment, a first test fiber 63 is extended from the coupler 41 to allow for upstream transmit test, or other desired fiber optic testing. The first test fiber 63 may form a transmit test fiber. In various embodiments, a second test fiber 65 is extended from the coupler 41 to allow for downstream receive test, or other desired fiber optic testing. The second test fiber 65 may form a receive test fiber. The coupler 41 operably couples the input fiber 42 to the test fibers 63, 65 to form the bypass access test interface to test the output signals from the signal splitter device 40.

Referring back to FIGS. 2-3, the test fibers 63, 65 are operably coupled to respective test ports 62, 64 extended through the housing 12, such as described above. In a particular embodiment, one or more of the test ports 62, 64 is extended through the cap 24. In other embodiments, the test port 62, 64 may be extended through other portions of the housing 12, such as the body 22. In certain embodiments, the test ports 62, 64 are hardened fiber optic connectors (HFOC) or other appropriate type of fiber optic connectors suitable for OSP environments, and/or a standard connector (SC), an angled physical contact (APC) connector, an SC/APC. In a particular embodiment, the test port 62, 64 is any appropriate fiber optic connector configured in accordance with Telcordia GR-3120 standards.

Embodiments of the apparatus 10 including the test interface 70 provided herein may allow for fiber optic testing without opening the housing 12. Accordingly, when the apparatus 10 is sealed, fiber optic testing may be performed without unsealing the housing 12, allowing for components and connections inside the housing 12 (e.g., at the plenum 14) to remain fluidly separate from environmental conditions outside of the housing 12 (e.g., precipitation, particulates, air temperature or pressure, humidity, or other climatic conditions). Still further, embodiments of the apparatus 10 provided herein may be connected at any node or drop point without requiring an existing fiber optic enclosure at the fiber optic distribution network, such as depicted and described in FIG. 6 with regard to embodiments of the fiber optic distribution network 100.

Embodiments of the apparatus 10 depicted and described in regard to FIGS. 1-5 allow for assembly in a factory controlled environment, which may mitigate errors or disconnects at the splices or other errors, reduces risks associated with debris, fluid, or other matter in undesired contact with components within the housing 12, reduces unit costs of the components for splice enclosures, and/or reduces costs by allowing for controlled factory manufacturing conditions in contrast to manufacturing in the field or other OSP location. Embodiments of the apparatus 10 provided herein allow for reduced component size and/or reduced size of the apparatus 10 in contrast to known splice enclosures. Embodiments of the apparatus 10 may allow for pre-fabrication in the factory controlled environment prior to utilizing in the OSP condition, and may further allow for customization based on desired filter channels, splitter numbers, and/or fiber optic cable stub length.

A particular embodiment of the apparatus 10 includes the housing 12 forming the plenum 14 with a volume between approximately 125 square inches and approximately 704 square inches. The volume may generally be defined between the opening 16 and the interior surfaces of the housing 12. The volume may particularly be defined between the sealed opening 16, an interior surface of the cap 24 distal to the opening 16, and an interior surface of the body 22. Various exemplary embodiments of the body 22 include a substantially cylindrical vessel forming a maximum radius within the plenum 14 between approximately 2 inches and approximately 4 inches. In various embodiments, the body 22 has a length between approximately 10 inches and approximately 14 inches.

Figure 6:
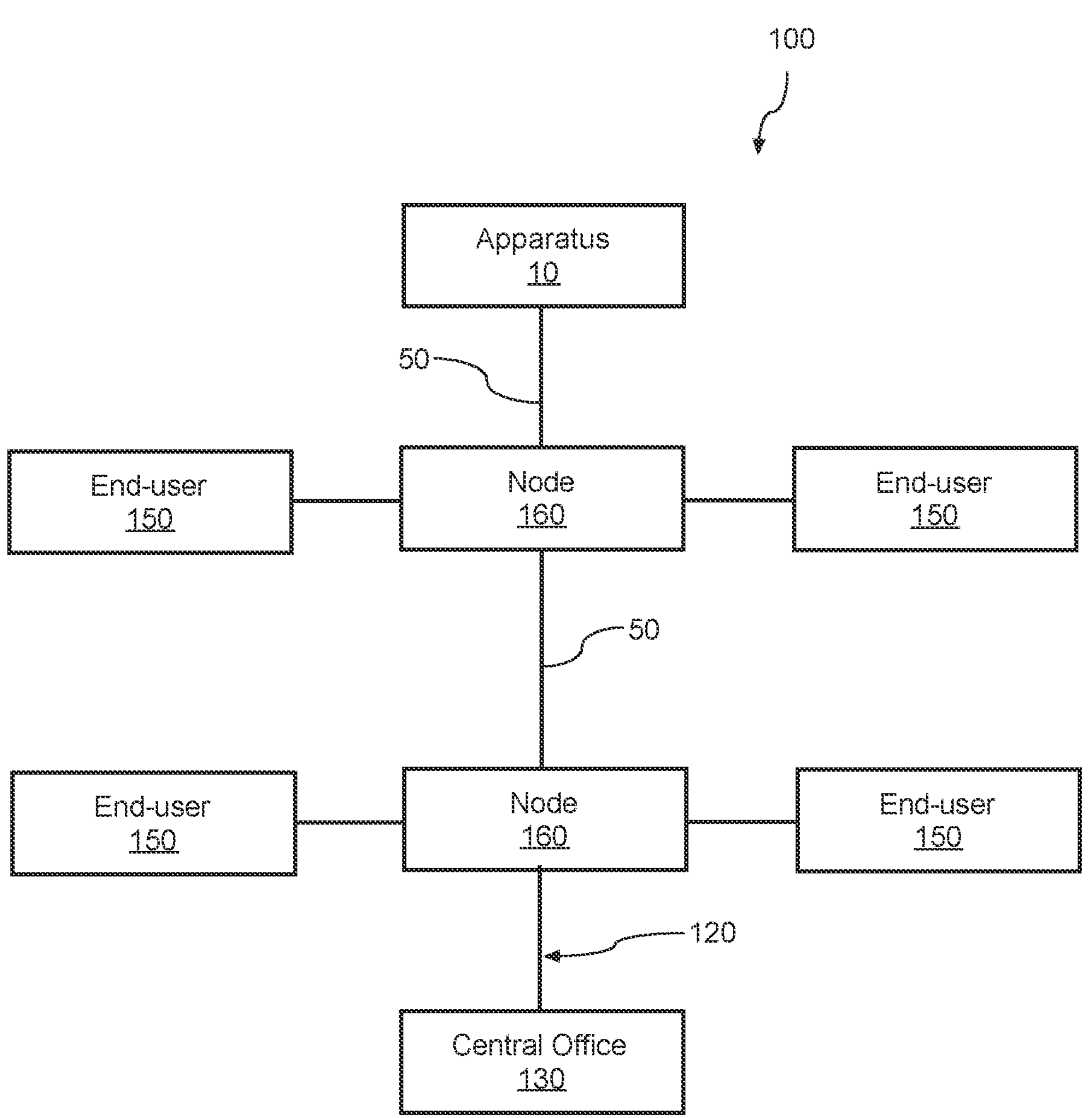
FIG. 6 is a flow chart depicting an exemplary fiber optic distribution network including an embodiment of a splice closure apparatus in accordance with embodiments of the present disclosure.

Referring now to FIG. 6, an exemplary schematic diagram of a portion of a fiber optic distribution network 100 (hereinafter, "network 100") is provided. The network 100 may be configured as any appropriate fiber optic telecommunications network, such as, but not limited to, a fiber to the node (FTTN) network, a fiber to the curb (FTTC) network, a fiber to the premises (FTTP) network, or generally, any fiber to the location (FTTX) network. Embodiments of the network 100 provided herein may include a fiber optic distribution cable 120 extended from a central office 130. One or more mid-span access locations, or nodes 160, is provided along a length of the distribution cable 120. The distribution cable 120 having a plurality of nodes 160 at branch points spaced along the length of the distribution cable provides access to one or more optical fibers of the network 100. The node 160 includes any appropriate enclosure or apparatus configured to protect the distribution cable 120 from exposure to the environment. In such embodiments, the network 100 has one or more locations or nodes 160 for joining one or more cable stubs 50 of the apparatus 10 to the distribution cable 120 at the mid-span access location. The node 160 may be configured as a break-out location, a drop terminal, or a fiber distribution hub. More specifically, an apparatus 10 may be connected to one or more nodes 160 to increase the fiber optic capabilities of those node(s) 160.

In one embodiment of the network 100, the distribution cable 120 includes pre-terminated optical fibers from one or more nodes 160 that are spliced to respective optical fibers of the cable stub 50 extended from the apparatus 10. In a particular embodiment, the pre-terminated optical fibers from the node 160 is spliced with the input optical fiber 52 of the cable stub 50. The distribution cable 120 may particularly connect with the input optical fiber 52 at the cable stub 50 at an end opposite or distal to an end at which the input optical fiber 52 is spliced (e.g., spliced with the input splice fiber 53) to connect with the signal splitter device 40 (FIG. 2).

The output optical fibers 54 of the cable stub 50 are optically connected to respective optical fibers of the network 100 at a connection terminal at a delivery point or end user 150. The connection terminal at the end user 150 may include an outside plant (OSP) network access point (NAP) closure, local convergence cabinet (LCC), network interface device (NID), terminal, pedestal, or other appropriate terminal or access point. The end-user 150 may generally define a subscriber premises or other delivery location. As depicted in FIG. 6, one or more output fibers 54 extends from the apparatus 10 positioned at a distance from one or more nodes 160. The node 160 may include a telephone pole, a hand-hole, vault, pedestal, or other appropriate mount location at the network 100, or combinations thereof. Each output fiber 54 is extended from the apparatus 10 to one or more nodes 160 for connection at a terminal at the end user 150.

In certain embodiments, the cable stub 50 is less than approximately 1000 feet in length. In still certain embodiments, the cable stub 50 is greater than approximately 10 feet, or greater than approximately 40 feet, or greater than approximately 100 feet. The fiber optic distribution cable 120 may be greater than 1000 feet in length. Embodiments of the apparatus 10, such as having one or more dimensions such as described herein, may allow for a compact, portable splice closure apparatus providing one or more benefits such as described herein. Components and arrangements such as provided herein may allow for reduced costs, improved quality, and/or portability over known splice closures that may form larger systems that require assembly on the field or other OSP location.

Further aspects of the invention are provided by one or more of the following embodiments:

1. An apparatus including a housing forming a plenum and an opening; a mount plate affixed in the plenum within the housing; a signal splitter device affixed to the mount plate; and a fiber optic cable stub extended through the opening of the housing. The cable stub includes an input optical fiber and an output optical fiber each operably connected to the signal splitter device.
2. The apparatus of any one or more embodiments herein, wherein the housing includes a body, and wherein the mount plate is affixed to the body of the housing.

3. The apparatus of any one or more embodiments herein, wherein the housing includes a body and a cap affixed to an end of the body.
4. The apparatus of any one or more embodiments herein, wherein the cap includes a transmitter test port operably.
5. The apparatus of any one or more embodiments herein, wherein the cap includes a receiver test port.
6. The apparatus of any one or more embodiments herein, wherein the plenum is formed between the body and the cap, and wherein the opening is formed through the cap.
7 The apparatus of any one or more embodiments herein, wherein the cap includes a hardened fiber optic connector.
8. The apparatus of any one or more embodiments herein, wherein the plenum is between approximately 125 square inches and approximately 704 square inches.
9. The apparatus of any one or more embodiments herein, wherein the signal splitter device is a wavelength division multiplexing device.
10. The apparatus of any one or more embodiments herein, wherein the signal splitter device is a planar lightwave circuit.
11. The apparatus of any one or more embodiments herein, wherein the cable stub is between approximately 100 feet and approximately 1000 feet long.
12. The apparatus of any one or more embodiments herein, the apparatus including a clamp configured to affix the cable stub to the mount plate.
13. The apparatus of any one or more embodiments herein, wherein the cable stub includes a jacket including an outer surface and an inner surface, wherein the outer surface is an exterior surface of the cable and the inner surface defines an interior space of the cable stub, and wherein the input optical fiber and the output optical fiber are disposed within the interior space, and wherein the jacket is extended through the opening of the housing.
14. The apparatus of any one or more embodiments herein, wherein the plenum is hermetically sealed.
15. A fiber optic distribution network, the network including a fiber optic distribution cable, an end user, and a splice closure apparatus. The apparatus includes a housing forming a plenum and an opening; a mount plate affixed in the plenum within the housing. A signal splitter device is affixed to the mount plate. A fiber optic cable stub is extended through the opening of the housing. The fiber optic cable stub includes an input optical fiber operably connected to the signal splitter device and the fiber optic distribution cable. The fiber optic cable stub includes an output optical fiber operably connected to the signal splitter device and the end user.
16. The network of any one or more embodiments herein, wherein the housing includes a body, and wherein the mount plate is affixed to the body of the housing.
17. The network of any one or more embodiments herein, wherein the housing includes a body and a cap affixed to an end of the body, wherein the cap comprises one or both of a transmitter test port operably or a receiver test port.
18. The network of any one or more embodiments herein, wherein the fiber optic cable stub includes a jacket including an outer surface and an inner surface, wherein the outer surface is an exterior surface of the cable and the inner surface defines an interior space of the fiber optic cable stub, and wherein the input optical fiber and the output optical fiber are disposed within the interior space, and wherein the jacket is extended through the opening of the housing.
19. The network of any one or more embodiments herein, wherein the input optical fiber is operably connected to the fiber optic distribution cable outside of the housing, and wherein the output optical fiber is operably coupled to the end user outside of the housing.
20. The network of any one or more embodiments herein, wherein the plenum is hermetically sealed.
21. The network of any one or more embodiments herein including the apparatus of any one or more embodiments herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus, the apparatus comprising:
a housing comprising a body, a first cap and a second cap each receivable at opposing ends of the body, the housing forming a plenum between the body and the first and second caps, wherein one or more of the first cap or the second cap forms an opening;
a mount plate affixed in the plenum to the body within the housing;
a signal splitter device affixed to the mount plate; and
a fiber optic cable stub extended through the opening of the housing, wherein the cable stub comprises an input optical fiber and an output optical fiber each operably connected to the signal splitter device.

2. The apparatus of claim 1, wherein the second cap comprises a transmitter test port.

3. The apparatus of claim 2, wherein the second cap comprises a receiver test port.

4. The apparatus of claim 1, wherein the cap comprises a hardened fiber optic connector.

5. The apparatus of claim 1, wherein the plenum comprises between approximately 125 square inches and approximately 704 square inches.

6. The apparatus of claim 1, wherein the signal splitter device comprises a wavelength division multiplexing device.

7. The apparatus of claim 1, wherein the signal splitter device comprises a planar lightwave circuit.

8. The apparatus of claim 1, wherein the cable stub is between approximately 40 feet and approximately 1000 feet long.

9. The apparatus of claim 1, the apparatus comprising:
a clamp configured to affix the cable stub to the mount plate.

10. The apparatus of claim 1, wherein the cable stub comprises:
a jacket comprising an outer surface and an inner surface, wherein the outer surface is an exterior surface of the cable and the inner surface defines an interior space of the cable stub, and wherein the input optical fiber and the output optical fiber are disposed within the interior space, and wherein the jacket is extended through the opening of the housing.

11. The apparatus of claim 1, wherein the first cap and the second cap are configured to receive a potting material to hermetically seal the plenum.

12. The apparatus of claim 1, the apparatus comprising:
a splice tray affixed to the mount plate.

13. A fiber optic distribution network, the network comprising:
a fiber optic distribution cable;
an end user; and
a splice closure apparatus, the apparatus comprising:
a housing comprising a body, a first cap and a second cap each receivable at opposing ends of the body, the housing forming a plenum between the body and the first and second caps, wherein one or more of the first cap or the second cap forms an opening;
a mount plate affixed in the plenum to the body within the housing;
a signal splitter device affixed to the mount plate; and
a fiber optic cable stub extended through the opening of the housing,
wherein the fiber optic cable stub comprises an input optical fiber operably connected to the signal splitter device and the fiber optic distribution cable, and wherein the fiber optic cable stub comprises an output optical fiber operably connected to the signal splitter device and the end user.

14. The network of claim 13, wherein the first or second cap comprises one or both of a transmitter test port or a receiver test port.

15. The network of claim 13, wherein the fiber optic cable stub comprises:
a jacket comprising an outer surface and an inner surface, wherein the outer surface is an exterior surface of the cable and the inner surface defines an interior space of the fiber optic cable stub, and wherein the input optical fiber and the output optical fiber are disposed within the interior space, and wherein the jacket is extended through the opening of the housing.

16. The network of claim 15, wherein the input optical fiber is operably connected to the fiber optic distribution cable outside of the housing, and wherein the output optical fiber is operably coupled to the end user outside of the housing.

17. The apparatus of claim 1, wherein the body of the housing comprises a cylindrical, tube, or frusto-conical structure and an interior surface having a maximum radius between approximately 2 inches and approximately 4 inches, wherein the mount plate is affixed to the body within the plenum.

18. The apparatus of claim 12, wherein the splice tray is positioned on the mount plate on a first side opposite of the signal splitter device positioned on a second side.

19. The network of claim 13, wherein the body of the housing comprises a cylindrical, tube, or frusto-conical structure and an interior surface having a maximum radius between approximately 2 inches and approximately 4 inches, wherein the mount plate is affixed to the body within the plenum.

20. The network of claim 13, the apparatus comprising:
a splice tray affixed to the mount plate, wherein the splice tray is positioned on the mount plate on a first side opposite of the signal splitter device positioned on a second side.

* * * * *